United States Patent [19]

Miller et al.

[11] Patent Number: 4,479,293
[45] Date of Patent: Oct. 30, 1984

[54] PROCESS FOR FABRICATING INTEGRALLY BLADED BIMETALLIC ROTORS

[75] Inventors: John A. Miller, Jupiter; Ralph E. Anderson, Palm Beach Gardens; Marvin M. Allen, Lake Worth, all of Fla.

[73] Assignee: United Technologies Corporation, Hartford, Conn.

[21] Appl. No.: 325,149

[22] Filed: Nov. 27, 1981

[51] Int. Cl.³ .............................................. B21K 3/00
[52] U.S. Cl. .................................. 29/156.8 R; 72/364; 148/11.5 Q; 148/127; 416/241 R
[58] Field of Search .................... 29/156.8 R; 148/127, 148/11.5 N, 11.5 Q; 416/241 R, 244 A, 213 R; 72/342, 364

[56] References Cited

U.S. PATENT DOCUMENTS

| | | | |
|---|---|---|---|
| 3,122,823 | 3/1964 | Lazar et al. | 29/156.8 B |
| 3,519,503 | 7/1970 | Moore et al. | 148/11.5 F |
| 3,574,004 | 4/1971 | Flynn | 148/127 |
| 3,795,970 | 3/1974 | Keathley et al. | |
| 3,975,219 | 8/1976 | Allen et al. | 148/11.5 N |
| 4,063,939 | 12/1977 | Weaver et al. | 29/156.8 B |
| 4,074,559 | 2/1978 | Beane et al. | 29/156.8 B |

Primary Examiner—Howard N. Goldberg
Assistant Examiner—P. W. Echols
Attorney, Agent, or Firm—Stephen E. Revis

[57] ABSTRACT

An integrally bladed bimetallic rotor for high temperature operation having airfoils with good stress rupture and creep strength and a hub with high tensile strength and good low cycle fatigue resistance is made from a preform of two concentric cylinders of different superalloy metals metallurgically bonded to each other at their interface, both materials being in such a condition that they exhibit superplastic behavior at a certain, controlled strain rate and temperature without incurring substantial grain growth. The metal of the outer cylinder is selected such that it has a lower gamma prime solvus temperature than the metal of the inner cylinder. The preform is isothermally forged at the controlled strain rate and temperature to form the airfoils from the alloy of the outer cylinder and to form the hub from the alloy of the inner cylinder. A sharp, reproducible interface is created between the two alloys. After forging, the rotor is heated to a temperature between the gamma prime solvus temperatures of the alloys and under conditions which cause full gamma prime solutioning of the airfoils up to the interface but only partial gamma prime solutioning of the rotor hub. The resulting airfoils have coarse grains and the hub has fine equiaxed grains.

9 Claims, 1 Drawing Figure

PROCESS FOR FABRICATING INTEGRALLY BLADED BIMETALLIC ROTORS

DESCRIPTION

1. Technical Field

This invention relates to integrally bladed rotors and methods for making the same.

2. Background Art

Rotors, such as for gas turbine engines and the like, are typically subjected to high stresses and high temperatures. Their design, contruction and the materials from which they are made often dictate operating limits for the apparatus in which they are employed. Extensive efforts have been made over the years to develop new alloys, new fabrication techniques, and new component designs which permit operation of these rotors at higher operating temperatures and/or which lead to lighter weight, longer lived components with all their attendant advantages.

The most common rotor design used today in high temperature, high speed applications, such as in gas turbine engines for jet aircraft, comprises a hub with blades or airfoils mechanically attached to the hub rim, such as by the use of the well known dovetail and fir tree shaped roots. The alloy used for the hub is selected to meet the requirements of high tensile strength and good low cycle fatigue resistance. Such porperties are found in, for example, fine equiaxed grain superalloy materials. The airfoils, which are exposed to the higher temperatures of the gas path and greater centrifugal loads, are stress rupture and creep limited; thus, they are made from materials having good stress rupture and creep characteristics which are typical of coarser grained materials. No alloy processed to a singular microstructure could give optimum properties demanded by the conditions in both the hub section and airfoils in advanced turbine engines without placing an extreme tax on either the designer's skill or the component weight. However, superalloys heat treated to a columnar grain structure (removal of grain boundaries perpendicular to the principal stress axis) have demonstrated large stress rupture and creep improvements over those of the same alloy in the fine grain condition.

There are a multitude of rotor fabricating techniques disclosed in the prior art in addition to the aforementioned conventional technique of fabricating a hub and separate airfoils wherein the airfoils have roots which slip into corresponding slots in the rim of the hub and are retained therein by various mechanic means. For example, in U.S. Pat. No. 2,894,318 the individual airfoils with roots are first fabricated by any suitable method; they are then arranged around the circumference of a mold, and the hub is cast around the roots of the airfoils. In U.S. Pat. Nos. 4,063,939 and 4,097,276 a plurality of blades are fixtured around the periphery of a mold with their roots extending into the mold. The mold is filled with powdered ceramic or superalloy material which is then heated and isostatically pressed to compact the powdered material around the root portions to form what is therein referred to as a unitary hub.

In U.S. Pat. No. 2,479,039 an integrally bladed rotor is formed by casting, thereby eliminating any junction either in the form of blade fastenings or welded attachment of the blades to the hub. The hub and blade materials may be different to satisfy the different requirements of the hub and the blades. U.S. Pat. No. 2,703,922 describes a method for making a rotor disk or hub having a rim material different from the core or central material. This is done by forming a composite cylindrical metal body by casting a first material in a mold about a solid core of a second material, and axially upsetting this composite body, by hot working, to form a disk corresponding roughly to the overall diameter of the finished turbine disk, which is then heat treated. Individual airfoils would be attached later.

Lazar et al U.S. Pat. No. 3,122,823 uses conventional forging techniques to forge an integrally bladed rotor. In one embodiment, Lazar et al first forges a preform close to the finished shape of the disk but with excess material at the rim. This excess material is forced radially outwardly into blade forming dies in another forging operation to form an integrally bladed rotor with blades and disks of the same material. In another embodiment Lazar et al forges a disk rim with integral blades. A central hub of a different material may then be secured by suitable means to the inner cylindrical surface of the rim.

A more recent development is the Gatorizing® isothermal forging method useful with high temperature superalloys as described in commonly owned U.S. Pat. No. 3,519,503, the teachings of which may be used in conjunction with commonly owned U.S. Pat. Nos. 4,074,559 and 4,265,105 which describe apparatus which may be used to forge integrally bladed rotors from these superalloys.

The state-of-the-art for integrally bladed superalloy rotors is more fully described in a paper titled "Fabrication and Heat Treatment of a Ni-Base Superalloy Integrally Bladed Rotor for Small Gas Turbine Engine Applications" by Hughes, Anderson and Athey published on June 22, 1980 in Modern Developments in Powder Metallurgy—Vol. 14 Special Materials, published by Metal Powder Industries Federation. That paper discusses the fabrication of an integrally bladed rotor by the aforementioned Gatorizing process using a single superalloy throughout. Desired differences in properties as between the airfoil and the hub portion of the rotor are obtained by directionally recrystallizing the airfoils from their tips to a desired distance into the rim of the hub. The hub retains its fine equiaxed grains. This is followed by a full gamma prime solution heat treatment of the entire rotor, followed by typical precipitation and aging heat treatment cycles. Although the process described in the foregoing paper results in an integrally bladed rotor with airfoils having different and desirable properties in the hub and airfoil portions, the boundary definition between the columnar grains of the airfoils and the equiaxed grains of the hub would be difficult to repeat in a production operation, making characterization of the rotor for purposes of optimum design difficult.

DISCLOSURE OF INVENTION

An object of the present invention is an improved quality integrally bladed rotor.

Another object of the present invention is a process for manufacturing an improved integrally bladed rotor.

A further object of the present invention is an integrally bladed rotor having airfoils made from one material and the hub portion made from a different material.

Yet another object of the present invention is an integrally bladed bimetallic rotor for high temperature operation having airfoils which have good stress rupture and creep strength and a hub which has high tensile strength and good low cycle fatigue resistance.

Another object of the present invention is a rotor having all the advantages of bimetallic rotors and integrally bladed rotors of the prior art, without the disadvantages.

According to the present invention an integrally bladed bimetallic rotor is made by isothermally forging, at a controlled strain rate, a preform made from a billet comprising concentric cylinders of different superalloy metals which are metallurgically bonded to each other at their interface, the alloy of the external cylinder having a lower gamma prime solvus temperature than the alloy of the internal cylinder, wherein the outer alloy is formed into the airfoils during said isothermal forging while the internal material is formed into the hub of the rotor, both materials exhibiting superplastic behavior at the controlled strain rate and isothermal forging temperature without substantial grain growth, wherein after forging the article is heat treated under temperature conditions which effect grain growth in the airfoils without causing substantial grain growth in the hub.

According to a preferred embodiment, the billet referred to above is formed by coextruding the two superalloys. This both creates the metallurgical bond between the alloys and, under the proper conditions, puts the alloys into the required condition of exhibiting superplastic behavior during the isothermal forging step.

One advantage of the present invention is that the material for the airfoils and the hub may be selected and the process for making the bimetallic, integrally bladed rotor may be tailored such that the airfoils have good stress rupture and creep strength and the hub has desirable high tensile strength and good low cycle fatigue resistance.

Another advantage of the present invention is the sharp, reproducible interface between the airfoil material and hub material and its excellent integrity. The sharp boundary and its reproducibility is critical to being able to accurately characterize the properties of the rotor in order that the best compromise between strength, weight and durability may be made by the designer.

More specifically, an advantage of the present invention is that the difference in gamma prime solvus temperature between the two superalloys permits a single heat treatment of the rotor at a temperature just above the gamma prime solvus of the radially outer material, which same temperature is below the gamma prime solvus of the radially inner material. Thus, grain growth may be effected in the outer material without substantial grain growth in the inner material. Since the present invention includes forming the airfoils from the outer material and the hub from the inner material and results in a sharp, reproducible interface between the two, then the grains of the airfoils may be coarsened without substantially increasing the size of the finer equiaxed grains in the hub. Preferably the heat treatment temperature is selected to effect a full gamma prime solutioning of the airfoils and a partial gamma prime solutioning of the hub.

For very high temperature applications it is preferred to effect directional grain growth in the airfoils to form columnar grains from their tip to the interface between the two metals. Careful thermal gradient control can readily produce these columnar grains in the airfoil with minimal grain growth beyond the well-defined airfoil/hub interface as a result of the different gamma prime solvus temperatures of the airfoil and hub materials.

According to a further aspect of the present invention, in order to increase the integrity of the bond at the interface between the airfoils and the hub of the finished rotor, the surface area of the bond interface between the two alloys of the billet from which the rotor is forged is preferably increased by at least a factor of two by upsetting the preform in a direction perpendicular to the axis of the cylinders prior to completing the step of isothermally forging the airfoils. Most preferably the preform is also upset between dies designed to create a mechanical, interlocking interface between the airfoils and hub to even further improve rotor integrity, as will be more fully explained hereinbelow.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
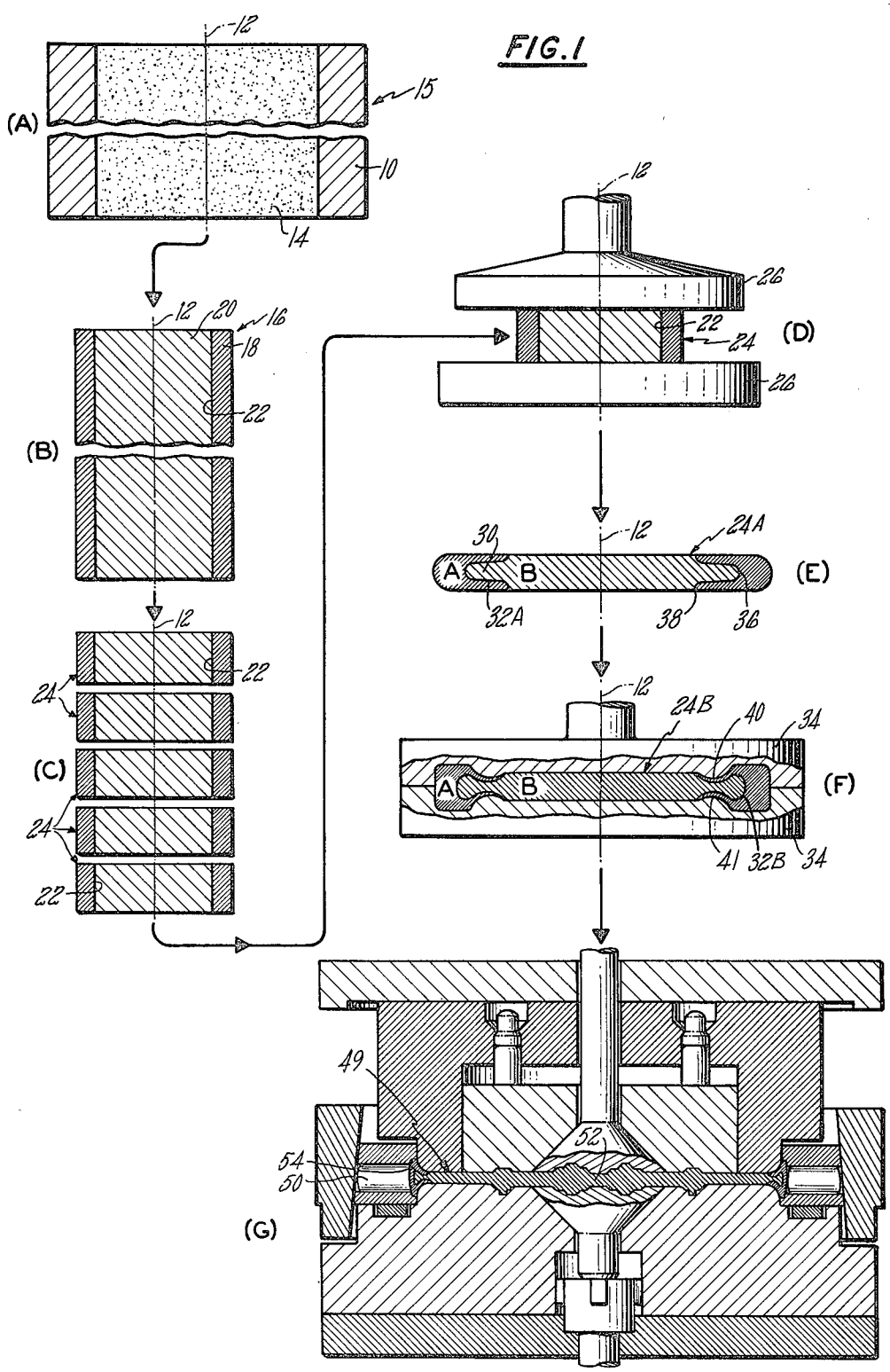
FIG. 1, parts (A) to (G), is a step-by-step schematic representation of the process for forming integrally bladed rotors of the present invention.

The steps in the process for fabricating the integrally bladed bimetallic rotor of the present invention are best described with reference to FIG. 1. As a preliminary step in the fabrication process, a billet must be formed comprising an outer cylinder of the airfoil material metallurgically bonded to a concentric inner cylinder of the hub material. Several considerations need to be taken into account in selecting suitable materials. Since this invention is directed to the fabrication of rotors for current and advanced gas turbine engines operating at turbine inlet temperatures of 2100° F. or higher, it is contemplated that the rotor will be made only from the superalloys which are nickel or cobalt base alloys with chromium, titanium, aluminum, and refractory metal alloy additions. Nickel is the preferred base material. In addition to selecting materials which must ultimately have properties adequate to withstand the operating environment of the rotor over a suitably long period of time, it is critical that the airfoil alloy have a gamma prime solvus temperature less than the gamma prime solvus temperature of the alloy selected for the hub portion in order that a heat treatment may be used which coarsens the grains in the radially outer airfoil alloy without exceeding the solvus temperature of the radially inner hub material. Preferably there is at least a 50° F. difference in the gamma prime solvus temperatures, although a difference of as little as 25° F. would probably be workable. For example, the airfoils might be made from Astroloy (a nickel base superalloy having a nominal composition of 15 Cr, 17 Co, 3.5 Ti, 4.0 Al, 5.0 Mo, balance Ni) which has a gamma prime solvus temperature of 2070° F., and the hub portion may be made from modified IN 100 (a nickel base superalloy having a nominal composition of 12.4 Cr, 18.5 Co, 4.3 Ti, 5.0 Al, 3.2 Mo, 0.8 V, balance Ni) which has a gamma prime solvus temperature of 2150° F. Alternatively, the airfoils may be made from AF2-1DA (12.0 Cr, 10.0 Co, 3.0 Ti, 4.5 Al, 3.0 Mo, 1.5 Ta, 6.0 W, balance Ni) and the hub portion may be made from MERL 76 (12.4 Cr, 18.5 Co, 4.3 Ti, 5.0 Al, 3.2 Mo, 1.4 Cb, 0.4 Hf, balance Ni) which have gamma prime solvus temperatures of 2110° F. and 2175° F., respectively. Other combinations are also possible.

One method for making a billet suitable for use in fabricating a rotor in accordance with the present invention is to first form a tube or cylinder of the airfoil alloy, such as by extrusion or any other known means. An inner cylinder of the hub alloy may be separately formed and press fitted into the first cylinder and the two cylinders coextruded. Alternatively, as shown in FIG. 1A, an outer cylinder 10, having an axis 12, may be filled with a hub alloy 14 in powder form and the assembly 15 coextruded to form a dual alloy billet 16 (FIG. 1(B)). Preferably the alloy powder 14 is made by rapid solidification rate cooling. Examples of the rapid solidification rate (RSR) cooling process for forming metal powders is shown and described in commonly owned U.S. Pat. Nos. 4,025,249; 4,053,264; and 4,207,040.

In either of the above methods the coextrusion step results in the formation of a metallurgical bond at the interface between the two alloys. Furthermore, the coextrusion must be accomplished under conditions which result in both superalloys exhibiting superplastic behavior at the strain rate and temperature of the isothermal forging operation which is to follow, without either alloy incurring substantial grain growth during the forging. The required extrusion conditions will vary depending upon the superalloys being used, but a reduction in diameter of at least four to one is usually required. Further information regarding extrusion conditions required to obtain this superplastic state may be obtained from above-referred to, commonly owned U.S. Pat. No. 3,519,503, which is incorporated herein by reference.

The dual alloy billet 16, comprising concentric cylinders 18, 20 of the selected superalloys, metallurgically bonded at their cylindrical interface 22, is then cut into forging preforms 24 of the appropriate thickness (FIG. 1(C)). As shown in FIG. 1(D), the preform 24 is then upset between flat dies 26 in the direction of the axis 12 of the cylinders to effect a reduction in the thickness of the preform 24 of at least 50%, preferably at least 75%, and to increase the area of the bond interface between the alloys. The result is the modified preform 24A of FIG. 1(E). As shown therein the airfoil superalloy material (designated by the letter A) now overlaps the outer periphery 30 of the hub superalloy material (designated by the letter B) creating a substantially U-shaped interface 32A in a cross section taken along a plane containing the axis 12. The increase in the surface area of the interface between the two superalloys breaks up potential oxide and/or carbide films thereby enhancing the bond between the alloys.

It is preferred, although not required, to further increase the integrity of the bond between the superalloys A and B by modifying the shape of the bond interface 32A in a manner resulting in a mechanical-like interlocking configuration. By this it is meant that the hub material B would mechanically restrain the airfoil material A from moving radially outwardly even if the two metals were not bonded along their interface. One method for achieving this preferred configuration is to form opposed annular depressions in opposite sides of the preform 24A between the radially outermost location 36 of the interface 32A and the radially innermost location 38 of the interface 32A. As shown in FIG. 1(F), this may be accomplished by a constrained upset operation between closed dies 34. The annular depressions are designated by the numerals 40, 41; and the new preform is designated by the numeral 24B. The constrained upset has the effect of simultaneously increasing the thickness of the preform at its periphery and modifying the shape of the interface 32A (FIG. 1(E)) such that it now has the appearance of a dovetail-like attachment (designated by the numeral 32B) between the two superalloys when viewed in a cross section taken in a plane containing the axis 12. In addition to adding mechanical strength at the interface between the two alloys, this additional constrained upset further increases the surface area of the interface or bond plane providing yet additional enhancement of its properties.

The further modified preform 24B is now ready to be forged to final shape or near final shape. The forging must be done isothermally at a temperature and at a controlled strain rate selected such that both superalloys exhibit superplastic behavior during the forging operation without substantial grain growth occurring in either alloy. A forging operation of this type is known by the trademark Gatorizing, and is the process described, for example, in U.S. Pat. No. 3,519,503, which is incorporated herein by reference.

The forging apparatus may be similar to that shown in hereinabove referred to commonly owned U.S. Pat. No 4,074,559. In that apparatus the superplastic material of the enlarged periphery of the preform is forced into a plurality of circumferentially disposed blade forming dies. FIG. 1(G) shows forging apparatus similar to that shown in FIG. 3 of that patent with the preform 24B having been forged into the shape of a rotor 49 having airfoils 50 integral with the hub portion 52. Note that the hub portion 52 of the rotor 49 is made essentially from superalloy B of the preform 24B; and the airfoils 50, including airfoil platforms 54, are made from the superalloy A of the preform 24B. Details of the forging apparatus are not a part of the present invention and can be obtained from U.S. Pat. No. 4,074,559, which is incorporated herein by reference.

In view of the difficulty in forging superalloys of the type preferred for high temperature gas turbine applications, it is contemplated conducting the preliminary upset steps (FIGS. 1(D) thru (F)) under the same isothermal and controlled strain rate forging conditions as used to form the airfoils and final hub configuration (i.e., Gatorizing forging conditions). Furthermore, it may also be desirable to combine these preliminary upset steps into a single constrained upset using an appropriately configured die. Finally, in yet another alternative method for practicing the present invention, the constrained upset step depicted by FIG. 1(F) could be accomplished in conjunction with the isothermal forging step shown in FIG. 1(G) by the use of a suitably shaped die in the apparatus of FIG. 1(G).

Whichever of the alternative forging methods is used to arrive at the final integrally bladed bimetallic rotor configuration, at this point both the airfoils and the hub portion of the rotor have very fine equiaxed grains, preferably on the order of ASTM 12-14. This fine grain size is desirable for the hub wherein optimum low cycle fatigue strength is required; however, coarser grains, no less than ASTM 3 and preferably on the order of ASTM 1 to 00, are desired in the airfoils to optimize creep rupture strength. This desired grain size is achieved by a full gamma prime solutioning treatment of the airfoils. A partial gamma prime solutioning heat treatment of the hub material is also desired for purposes of subsequent, conventional gamma prime aging heat treatments. Both are accomplished in accordance with the present invention by heat treating the integrally bladed bimetallic rotor at a temperature above the gamma prime solvus of the airfoil material but somewhat below the gamma prime solvus of the hub material. In view of the initial selection of materials, this heat treatment may be at a single temperature between the gamma prime solvus temperature of the hub and airfoil materials, preferably 50° to 75° F. below the gamma prime solvus temperature of the hub material, although a difference of as little as 25° F. is probably adequate. The temperature should not be more than about 150° F. below the gamma prime solvus temperature of the hub material, or partial solutioning of the gamma graims in the hub is not likely to occur. During this heat treatment step the gamma grains of the airfoil material experience a great increase in size whereas, by comparison, the gamma grains of the hub material remain substantially unchanged. Thus, there is an abrupt change in grain size at the interface between the two materials. Subsequently the rotor is subjected to additional, conventional heat treatment cycles to restore essentially normal strength and hardness to both superalloys. Since the shape and location of the interface is accurately reproducible, the properties and characteristics of the rotor can be clearly defined at any point within the rotor for ease in designing the optimum rotor shape and thickness.

In accordance with a preferred embodiment of the present invention, in place of the single temperature heat treatment of the rotor to increase the grain size of the airfoils (or in addition thereto), the airfoils are heat treated to directionally grow the grains of the airfoils such as by the process described in commonly owned U.S. Pat. No. 3,975,219. As discussed therein, in order to obtain an airfoil having elongated grains with axes parallel to the radial direction, the grains of the airfoil material are grown directionally by passing the airfoils through a thermal gradient. The hot end of the thermal gradient must exceed the gamma prime solvus temperature but obviously must not be allowed to exceed the solidus temperature of the material. The gamma prime solvus must be exceeded so that dissolution of the gamma prime particles will occur. If this dissolution does not occur, grain growth will not occur. The thermal gradient should have a slope of at least about 50° F. per inch measured at the gamma prime solvus temperature and preferably at least about 100° F. per inch. Grain growth of the airfoil is accomplished by passing the thermal gradient through the airfoils radially toward the roots at a rate of motion of less than about two inches per hour. Grain growth occurs along the axis of relative gradient motion, and the direction of grain elongation is perpendicular to the thermal gradient. If the thermal gradient is planar, all the elongated grains will have parallel axes of elongation. The gamma prime particles will reprecipitate during cooling or subsequent exposure to elevated temperatures below the gamma prime solvus. In the rotor of the present invention, if the gamma prime solvus temperature difference between the hub and airfoil materials is sufficiently great, it will be possible to obtain uniform elongated, parallel, columnar grains from the airfoil tips to the interface between the metals, with substantially no grain growth within the hub material.

In accordance with the forgoing teachings, an integrally bladed bimetallic rotor may be made using IN 100 for the disk material and AF2-1DA for the airfoil material. The gamma prime solvus temperature of IN 100 is nominally 2150° F. and the gamma prime solvus temperature of AF2-1DA is nominally 2100° F. These materials are extruded at 2000° F. at a reduction ratio of 6:1 so as to exhibit superplastic behavior at, for example, a forging temperature of 2000° F. and a strain rate of 0.1 in./in./min. without substantial grain growth. After isothermally forging the rotor at the aforementioned temperature of 2000° F. and strain rate of 0.1 in./in./min. in accordance with the teachings of the present invention, both the hub portion and the airfoils would have a grain size of about ASTM 12-14. To increase the grain size of the airfoils to ASTM 1 to 00, the entire rotor is then heated in an inert atmosphere to a temperature of 2125° F. and held at that temperature for approximately two hours. At that temperature the grain size of the hub would coarsen slightly to ASTM 10-12, which is insubstantial relative to the increase in the grain size of the airfoils. A further heat treatment for stabilization or aging would correspond to that normally associated with heat treatment of the hub portion. Thus, in this example the rotor is stabilized at 1600° F. for 40 minutes plus 1800° F. for 45 minutes followed by an aging cycle of 1200° F. for 24 hours plus 1400° F. for four hours.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A process for fabricating an integrally bladed bimetallic rotor having coarse grained airfoils and an equiaxed fine grained hub portion, comprising the steps of:
   (1) forming a bimetallic preform having an axis and comprising a first cylinder of a first superalloy metal surrounded by a second cylinder of a second superalloy metal, said second superalloy metal being selected to have a gamma prime solvus temperature at least 25° F. lower than the gamma prime solvus temperature of said first superalloy metal, said step of forming a bimetallic preform including the step of metallurgically bonding said second cylinder along its entire inner surface to said first cylinder, and including imparting to said first and second superalloys the property of exhibiting superplastic behavior at a first strain rate and first forging temperature without incurring substantial grain growth;
   (2) isothermally forging, at said first temperature and first strain rate, said bimetallic preform, said step of forging comprising forging said first cylinder into the shape of said hub portion and said second cylinder into the shape of said airfoils; and
   (3) heat treating the forged article to effect full gamma prime solutioning in the airfoils and partial gamma prime solutioning in the tub portion and to restore essentially normal strength and hardness to both superalloys.

2. The process according to claim 1 wherein during said step of isothermal forging but prior to forging said second cylinder into said airfoils, said isothermal forging includes upsetting said preform along the axis of the cylinders to effect a reduction in the thickness of the preform of at least 50% and to increase the area of contact between the first and second superalloy metals.

3. The process according to claim 2 wherein the initial area of the interface between the first and second superalloy metals in the cylindrical bimetallic preform from which the rotor is forged is increased by at least a factor of two during fabrication of the rotor.

4. The process according to claim 3 wherein in said step of heat treating, the airfoils and hub portion are heat treated simultaneously under the same conditions, including heating the entire rotor to a temperature above the gamma prime solvus temperature of said second superalloy metal but below the gamma prime solvus temperature of said first superalloy metal.

5. The process according to claims 2 or 4 wherein in the step of heat treating, the second superalloy metal is heated to a temperature above its gamma prime solvus temperature but less than gamma prime solvus temperature of said first superalloy metal, and said first superalloy metal is heated to a temperature less than its gamma prime solvus temperature, but within 150° F. thereof to effect a partial gamma prime solution heat treatment of said first metal.

6. The process according to claim 5 wherein the step of effecting grain growth in the airfoils includes directionally recrystallizing the airfoils to form columnar grains from the airfoil tips to the interface between the two superalloys.

7. The process according to claim 3 wherein said step of isothermally forging includes forming an interlocking configuration at the bond interface between the superalloys such that the hub material mechanically restrains the surrounding airfoil material from moving radially outwardly.

8. The process according to claim 3 wherein the step of upsetting includes forming a substantially U-shaped interface between the two alloys in cross-section taken along a plane containing the axis of the cylinders, said step of upsetting further including the step of necking down the preform between the radially outermost and radially innermost location of the said U-shaped interface and increasing the thickness of the preform at its periphery to create an interface between the two superalloys which has the appearance of a dovetail-like attachment between the first and second superalloys when viewed in cross section taken in any plane containing the axis of the cylinders.

9. The process according to claim 5 wherein the grain size throughout the rotor after the step of isothermally forging and before the step of heat treating is no greater than ASTM 12, and, after heat treating, the grain size throughout the airfoils is no less than ASTM 1 and the grain size throughout the hub is no greater than ASTM 10.

* * * * *